Dec. 26, 1939.   P. E. ERICKSON   2,184,588
AUTOMOBILE STEERING WHEEL
Filed Sept. 6, 1938
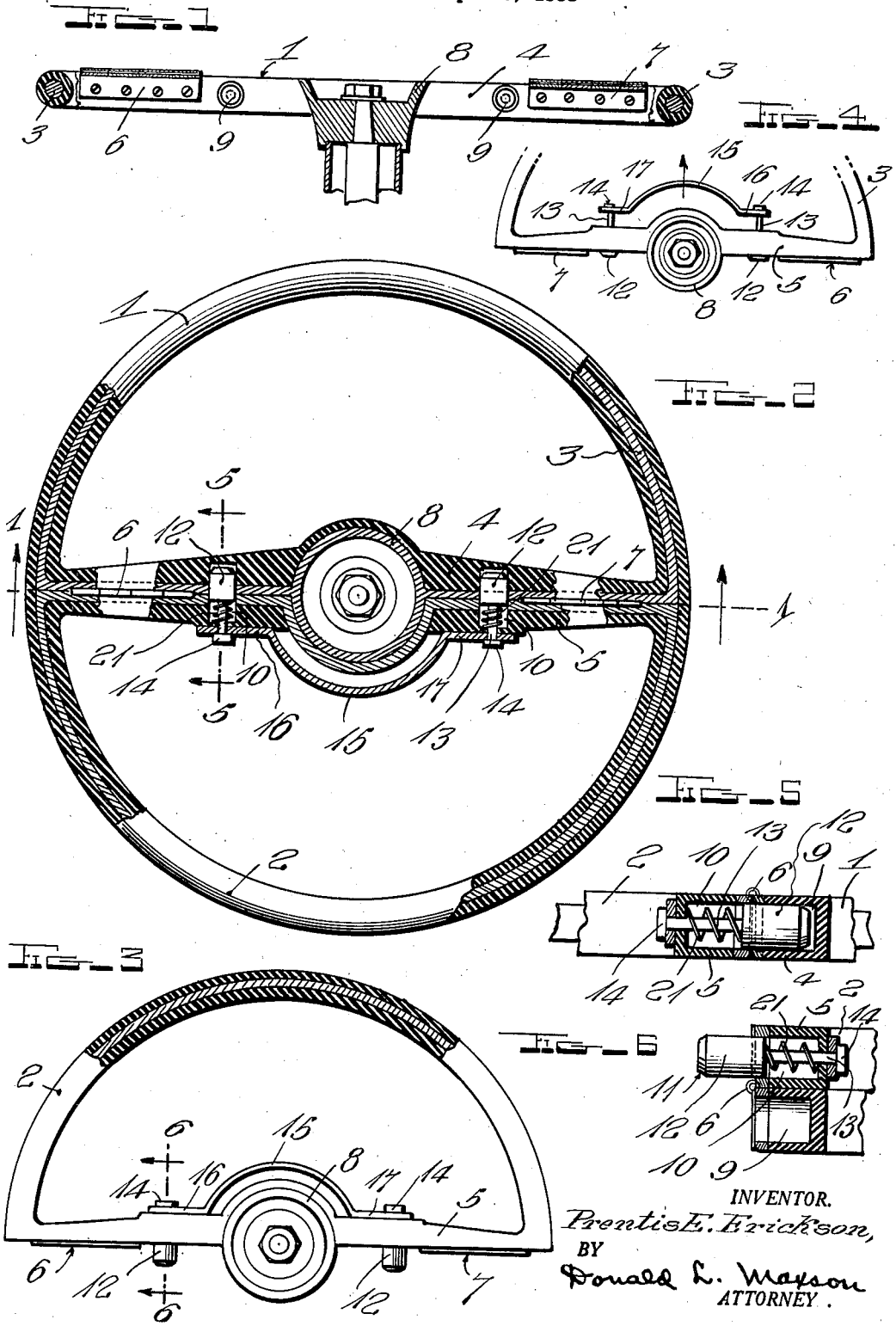
INVENTOR.
Prentis E. Erickson,
BY
Donald L. Mayson
ATTORNEY.

Patented Dec. 26, 1939

2,184,588

UNITED STATES PATENT OFFICE 2,184,588

AUTOMOBILE STEERING WHEEL

Prentis E. Erickson, Minneapolis, Minn.

Application September 6, 1938, Serial No. 228,660

2 Claims. (Cl. 74—555)

This invention relates to improvements in automobile steering wheels, and more particularly to a molded wheel having a single transverse spoke extending across the wheel, and said spoke being split, as well as the rim of the wheel, to provide for the folding up forwardly of the portion of the wheel nearest the driver, so that ready access may be had to and from the driver's seat.

An object of my invention is to provide an improved transversely split automobile steering wheel, which is provided with a single transverse spoke, the said rim and spoke being formed in two identical parts, and connected together by means of a pair of hinges, normally concealed within the spoke, and with a dual latch mechanism operated by a single hand operating mechanism placed adjacent the hub of the wheel, where it will be out of the way, but will be instantly ready for operation when it is desired to fold the wheel forwardly.

Another object of the invention is to provide an improved automobile steering wheel, which will be highly efficient in operation, and which will be quite inexpensive to manufacture.

Other objects will appear as the description proceeds.

In the accompanying drawing, which forms a part of my application,

Figure 1 is a sectional view taken on the line 1—1 of Figure 2;

Figure 2 is a plan view partly in section showing the hinge and latch arrangement for the wheel;

Figure 3 is a plan view partly in section, showing the wheel in folded position;

Figure 4 is a partial plan view of the folded wheel showing the latch mechanisms ready for snapping back into locking position;

Figure 5 is a partial sectional view taken on the line 5—5 of Figure 2, and

Figure 6 is a partial sectional view taken on the line 6—6 of Figure 3.

Like characters of reference are used throughout the following specification and the accompanying drawing to designate corresponding parts.

In carrying out my invention, I provide an automobile steering wheel, which is divided into two similar halves, and is further provided with a single transversely extending spoke, one half of the split spoke being carried by one half of the wheel, and the other half of the split spoke being carried by the other half of the wheel or rim.

The wheel is made in two portions designated 1 and 2, and is provided with a metal core 3, and with a single split transversely extending spoke forming portions 4 and 5. As seen from the drawing, the metal core 3 extends to the inner edges of the spoke sections 4 and 5, and that the section 5 will fold forwardly towards the front and will overlie the portion 4. A pair of piano type hinges 6 and 7 will be secured to the inner adjacent faces of the spoke sections 4 and 5, and will extend from points adjacent the rim of the wheel to points adjacent the hub thereof. The hub 8 of the wheel is also formed from metal and extends the full distance around the steering column, while the reinforcing core 3 in the spoke section 5 is formed to engage and fit about the hub 8, thereby reinforcing and strengthening the wheel assembly.

Sockets 9 and 10 are formed respectively in the spoke sections 4 and 5, and the sockets 10 are arranged to receive the spring projected latches 11. The latches 11 are formed with enlarged heads 12, and with guide rods 13 formed with the heads 14 at their ends, and projecting springs 21 are coiled about the rods 13 and are received within the sockets 10, for normally projecting the heads 12 of the latches 11 forwardly. A handle latch operating member 15 is provided and is formed with an arcuate central portion with oppositely extending alined ends 16 and 17, through which the guide rods 13 extend. The central portion 15 is arranged to lie near the hub of the wheel, but in such a manner that a hand may readily grasp the same and retract the latches 11 from the sockets 9 formed in the spoke section 4 in alinement with the sockets 10. Thus, it will be seen that when the wheel is in operation or ready for operation, the latches 11 will be received within the sockets 9, but when it is desired to fold the wheel upon itself, the handle 18 will be pulled towards the driver of the automobile, and when the heads 12 are free from the sockets 9, the rear half of the wheel may readily be swung on its hinges to overlie and seat on the forward half of the wheel.

From the foregoing description, it will be apparent that I have devised a very compact and efficient form of steering wheel, and one which will be free from complicated parts which might get out of order.

It will be understood that many minor changes in detail of construction may be resorted to without departure from the spirit of the invention.

Having thus described my invention, what I claim as new and desire to secure by Letters Patent of the United States is:

1. An automobile steering wheel comprising a rim and a single transversely extending spoke, said rim and spoke being split on a medial line forming similar wheel sections, concealed hinges connecting said spoke sections at opposite sides of the hub portion of the wheel, a pair of latch members carried by one spoke section adapted to engage and be received within the other spoke section to lock the wheel sections together, said spoke sections being formed with alined sockets to receive the latch members, and an arcuate latch control handle for retracting the latches when it is desired to fold one section of the wheel upon the other wheel section.

2. An automobile steering wheel comprising a rim and a single transversely extending spoke, said rim and spoke being split on a medial line forming similar wheel sections, concealed hinges connecting said spoke sections at opposite sides of the hub portion of the wheel, a pair of latch members carried by one spoke section adapted to engage and be received within the other spoke section to lock the wheel sections together, the spaced latch members being positioned between the hub and the hinges for the spoke sections, and a latch operating handle arranged in spaced relation to the wheel hub, and extending parallel therewith and having its extremities engaging the said latches.

PRENTIS E. ERICKSON.